United States Patent [19]

Erickson

[11] Patent Number: 4,477,994
[45] Date of Patent: Oct. 23, 1984

[54] ARTIFICIAL FISHING LURES

[76] Inventor: Stanton J. Erickson, 1259 Tall Pine Trail, Gulf Breeze, Fla. 32561

[21] Appl. No.: 430,342

[22] Filed: Sep. 30, 1982

[51] Int. Cl.³ .............................................. A01K 85/00
[52] U.S. Cl. .................................. 43/42.44; 43/42.45; 43/42.48; 43/42.08; 43/42.29
[58] Field of Search ................. 43/42.08, 42.09, 42.29, 43/42.39, 42.44, 42.45, 42.47, 42.48

[56] References Cited

U.S. PATENT DOCUMENTS

| D. 233,145 | 10/1974 | Miller | D22/27 |
|---|---|---|---|
| D. 240,623 | 7/1976 | McClellan | D22/27 |
| 881,805 | 3/1908 | Klein | 43/42.39 |
| 923,095 | 5/1909 | Wilcox | 43/42.39 |
| 2,229,239 | 1/1941 | Davis | 43/42.29 |
| 2,243,663 | 5/1941 | Wareham | 43/42.08 |
| 2,483,245 | 9/1949 | Steinhart | 43/42.48 |
| 2,578,041 | 12/1951 | Candioto | 43/42.48 |
| 2,611,209 | 9/1952 | Pond | 43/42.44 |
| 2,926,452 | 3/1960 | Lewis | 43/43.1 |
| 3,483,651 | 12/1969 | Borger | 43/42.39 |
| 3,979,853 | 9/1976 | Storm et al. | 43/42.29 |
| 4,090,317 | 5/1978 | Skwirut | 43/42.44 |
| 4,317,305 | 3/1982 | Firmin | 43/42.24 |

FOREIGN PATENT DOCUMENTS

| 454263 | 1/1949 | Canada | 43/42.44 |
|---|---|---|---|
| 2290149 | 6/1976 | France | 43/42.09 |
| 2422328 | 12/1979 | France | 43/42.47 |

Primary Examiner—Nicholas P. Godici
Assistant Examiner—Kurt Rowan
Attorney, Agent, or Firm—Terry B. McDaniel

[57] ABSTRACT

An artificial fishing lure is disclosed having one or more hooks mounted to extend upward from the upper or dorsal surface of the lure body to mimimize snagging or underwater debris. The hooks are permitted limited movement independent of the lure body, but stabilized so as not to interfere in the action of the lure.

8 Claims, 5 Drawing Figures

ARTIFICIAL FISHING LURES

BACKGROUND OF THE INVENTION (1) Field of the Invention

This invention relates generally to artificial fishing lures and more particularly to an artificial fishing lure which is especially suited to be fished along the bottom or surface of a lake, stream or bay with a minimum of snagging of debris. Most particularly, this invention relates to an artificial fishing lure which is provided with one or more hooks projecting upward from the dorsal surface of the lure body and adapted to remain stable and not interfere with the action of the lure.

(2) Description of the Prior Art

Many fishing lures have been proposed heretofore. Some of them have required a great deal of skill to manipulate in use and could be effectively employed only by a skilled angler. Others have the objectionable characteristic of catching on weeds, rocks, logs and other obstructions in the water, most usually located along the bottom. Various attempts have been made to solve this problem by constructing lures and hooks with guards intended to prevent entanglement with the weeds. However, such guards are not always completely effective. Furthermore, the guards decrease the efficiency of the hooks and make it easier for a fish to avoid capture.

One method of avoiding entanglement of fishing equipment with marine plants is taught by R. B. Lewis in U.S. Pat. No. 2,926,452. The patent teaches attaching a weed cutter to the fishing line ahead of the lure or hook. However, this additional equipment impairs manipulation of the bait, whether artificial or other. Also, the added equipment is designed only to deal with weeds. In the case of other debris, the weed cutter itself may represent a snagging problem rather than a cure.

In U.S. Pat. No. 3,483,651, G. F. Borger teaches resisting snagging underwater obstructions by providing a fishing lure the hook section of which curves rearward and upwardly from the rear of the body of the lure. While this hook orientation enhances the resistance to snagging, the fact that the hook trails the lure and is not shielded from debris by the body of the lure results in an unsatisfactory solution to the problem. Also, the patent teaches a lure with a fixed, or solidly attached, hook which aids the fish in disengaging the hook. Finally, the patent teaches providing only one single hook, which reduces the likelihood of success as compared to one or more double or triple hooks.

Therefore, an object of the present invention is to provide an aritifical fishing lure with improved resistance to snagging underwater debris.

More particularly, an object of the invention is to provide an artificial fishing lure with one or more single or multiple hooks dorsally attached to the body of the fish-shaped lure.

A further object of the invention is to provide an artificial fishing lure that is capable of effective use even by amateur and unskilled anglers. No special skill or technique is required to control the lure so as to perform movements similar to those of live bait. It responds instantly to simply lifting the rod tip to move the lure and then reeling the slack.

A still further object of the invention is to provide an artificial fishing lure adapted to permit attachment of a flexible material, such as plastic, leather or pork rind, onto the rearward end of the body of the lure to simulate a tail.

SUMMARY OF THE INVENTION

The above stated objects are met in the invention artificial fishing lure comprised of a single elongated body member conforming generally to the shape of a fish. The front edge, or face, of the lure is inclined either upwardly or downwardly approximately 45° to the longitudinal axis of the lure. Preferably, an oval or spoon-shaped metal plate may be attached to and substantially cover the front face and extend beyond the leading edge of the body of the lure extending the angle of inclination. A weighted element is attached to the underside of the forward portion of the body of the lure. Mounted on the upper or dorsal surface of the body member are one or more hooks, which may be externally or internally attached as described herein. In either method of attachment, means are provided to maintain extension of the hooks from the lure, thereby enhancing its effectiveness. The positioning of the stabilized hooks on the upper surface of the lure also minimizes snagging on underwater debris.

Along the rearward end of the body of the lure is formed a vertical slot adapted for attachment to the lure of a flexible tail portion which may be formed from plastic, leather, pork rind or other similarly suitable material.

BRIEF DESCRIPTION OF THE DRAWINGS

FIG. 3 further shows, in cross section, the channels in which the shaft portions of the hooks lie permitting some movement of the hooks but maintaining their upright posture.

DESCRIPTION OF THE PREFERRED EMBODIMENTS

Figure 1:
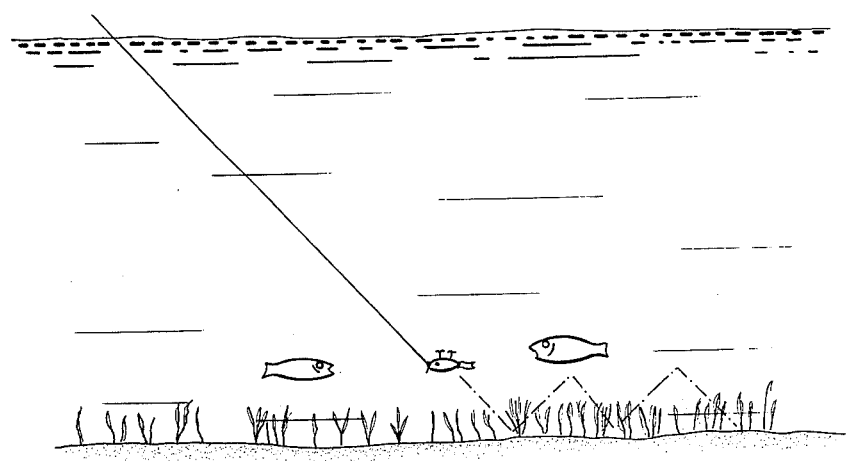
FIG. 1 is a sectional view showing a lure constructed according to the invention in use by a fisherman.

FIG. 1 shows the manner by which the dorsal attachment of the hooks on the lure, or the "hooks up" orientation, affords the use of the body of the lure to shield the hooks from becoming entangled in underwater bottom debris. Further, the stabilization of the hooks by the invention method permits the lure to perform as designed.

FIG. 1 shows the invention lure, as designed for bottom fishing, in use. The lure is attached to a suitable fish line and is cast, thrown, or dropped into the water. After the lure is allowed to settle to the bottom, the line or fishing rod is given a short upward movement and the line slack is taken up at brief intervals. FIG. 1 shows the path of the lure on the retrieve. Each time the lure is moved, the spoon on the front digs into the bottom stirring up debris which attracts the feeding fish. The fish normally chase the lure and hit on the drop part of the retrieve.

Figure 2:
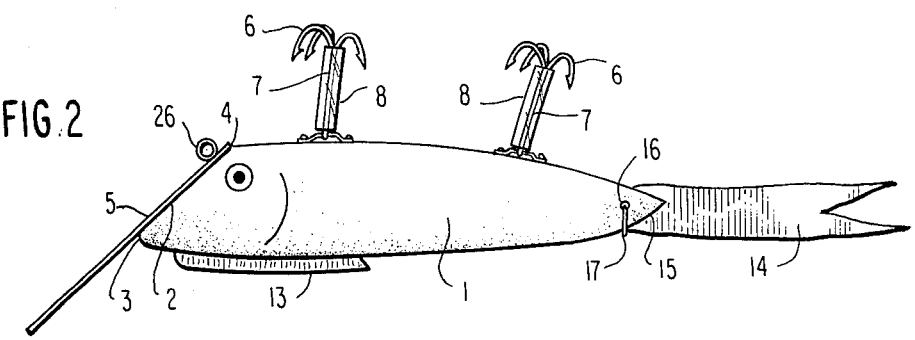
FIG. 2 is a side view of a lure in accordance with the invention with hooks externally mounted and adapted for fishing along the bottom of the body of water.

FIG. 2 represents the preferred embodiment of the invention lure when the hooks are externally mounted on the dorsal surface of a bottom fishing artificial lure. The lure is comprised of a single elongated body member 1 of oval cross section and generally conforming to the shape of a fish. The term fish is used in the generic sense to include minnows, fish and other aqueous animals of all kinds and sizes suitable for bait. The front edge, or face 2, of the lure is inclined upwardly and rearwardly from a leading edge 3 to a point 4 where the front end face joins the upper, or dorsal, surface of the lure. The angle of inclination of the front face 2 is preferably 40° to 55° to the longitudinal axis of the lure. Preferably, an oval or spoon-shaped metal plate 5, which may be referred to as a churning spoon, may be attached to and substantially cover the front face 2 of the lure body 1 and extend the angle of inclination beyond the leading edge 3. It is also preferable, though not required, that the front face 2 be formed having a concavity of somewhat parabolic shape with a curvature which increases gradually and progressively from the lower leading edge 3 to the point 4, or upper edge of the front face 2, the deepest point in the concavity being at the approximate center of the front face 2. Where the concavity is provided in the front face and a churning spoon is attached thereto, it is also preferred that such churning spoon be formed with a like concavity such that the portion of the churning spoon which lies on the front face of the lure conforms to the shape of the front face.

Also located on the front face 2, along the longitudinal axis and below point 4, or upper edge of front face 2, means 26 for attaching a fishing line to the lure is provided. An eye screw may be used which may also serve to aid attachment of a churning spoon 5 to front face 2.

The lure body member 1 is formed from any suitable buoyant material having a density less than water. Wood is a preferred material, either hardwoods or softwoods—the hardwoods being preferred for a bottom fishing lure and the softwoods being preferred for a surface fishing lure, but other materials having suitable durability and specific gravity may be used, to include plastics.

Figure 5:
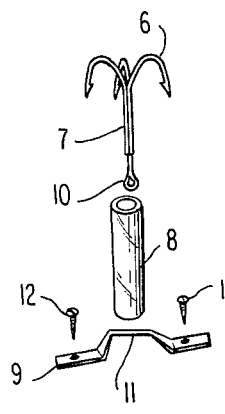
FIG. 5 shows the separate elements for the external hook attachment onto the dorsal surface of the lure according to the invention.

Mounted on the upper, or dorsal, surface of the lure body member 1 are hooks 6. The hooks 6 are mounted in a manner to insure their upward projection away from the lure by the invention method of attaching the hooks to the lure. The individual mounting elements of the invention method are more clearly shown in FIG. 5. The hooks 6 are secured to the lure body member 1 by means which permit movement of the hooks. Fitted around the shaft 7 of the hooks 6 is a hollow flexible cylindrical- or tube-shaped article 8, one end opening of which extends from the dorsal surface of the lure body member 1, or the means for securing the hooks 6 to the lure body member 1, to its other end opening which meets the curved portions of the hooks 6 such that pressure is exerted at both ends of the article 8. The tube-shaped article 8 may be formed from plastic or rubber tubing or may be formed from coiled wire, as in a spring, or may be formed from other suitable materials providing both support and flexibility. One suitable means for securing the hooks 6 to the lure body member is by use of a small metal strap 9 as shown in FIG. 5. First, the shaft 7 of the hook 6 is inserted through the tube-shaped article 8. Then the metal strap 9 is inserted through the hook eye 10 located at the end of the hook shaft 7 until the hook eye 10 reaches the middle section 11 of the metal strap 9. Finally, the metal strap 9 is secured to the lure body member 1 by the use of screws 12.

The invention is seen in the method of mounting the hooks to the dorsal surface of the lure and the lure produced thereby, irrespective of the number of hooks attached. One or more hooks may be attached, depending on the size and purpose of the lure. However, the hooks employed must provide an adequate number of pressure points to provide resistance to the upward pressure exerted by the tube-shaped article 8 on the curved section of the hooks. Therefore, double or triple hooks, well known in the art, are employed.

A weighted element 13 preferably formed from a heavy metal, such as lead, is attached to the underside of the forward portion of the body member 1. The weighted element 13 provides ballast to assure that the center of gravity of the lure is below the center of buoyancy so that when the lure is stationary in the water it is always in an upright position with the hooks extending upwardly above the lure. The amount of weight used depends on the size and material of the body and whether it is desired to provide a lure that floats or one that sinks. The weight is usually selected so that the lure will sink slowly, if it is not being pulled forwardly. The position of the weight is also selected to control the attitude of the lure so that it will stay level, or will be inclined upwardly or downwardly as desired.

The rearward end of the lure body member 1 is adapted for the attachment of a flexible tail portion 14 which may be formed from plastic, leather, pork rind or other suitable material. The adaptation is provided in the form of a vertical indentation along the longitudinal axis of the body member forming a slot 15 at the extreme rearward end of the lure body member 1 with a space, or hole, 16 provided through the rearward end of the body member 1 on either vertical side member of the slot 15. The tail portion 14 is then secured in the slot 15 by passing a pin 17 through the holes 16 and the tail portion 14. The pin 17 may be bent in a fashion to prevent its dislodgement through normal use of the lure.

Figure 3:
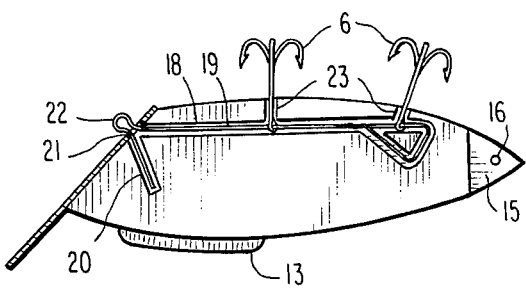
FIG. 3 is a longitudinal section of a lure according to the invention showing the channel provided in which a wire may lie to provide means for attaching the fishing line to the lure and means for internally attaching the hooks to the lure.

FIG. 3 is a longitudinal section of the invention lure wherein the hooks are attached internally to the lure and project through the upper, or dorsal, surface of the lure body member 1. This method of attachment also provides a degree of flexibility in hook movement but provides stabilization to maintain the "hooks up" orientation during manipulation of the lure while in use by the fisherman.

The limited hook movement provided by both external and internal methods of attachment protects the hooks from breaking off if they should become entangled. Also, if the hooks are not rigidly fixed to the lure a fish, once hooked, is less likely to break free by using the leverage of the lure to break off the hook. By the invention method of hook attachment to the lure, flexibility of the hooks is provided as well as stabilization in the "hooks up" orientation.

In the internal hook attachment shown in the longitudinal section of FIG. 3 a generally horizontal channel 18 is provided along the length of and internal to the lure body member 1 to receive a wire 19 for securing the hooks 6 to the lure. At the forward end of the channel, which has an opening 21 on the front face 2, a shorter recess channel 20 is provided to receive the forward end of wire 19. Starting at recess channel 20, the wire 19 projects through the opening 21 to form an eye 22 for attachment of the lure to the fishing line. After forming eye 22, the wire re-enters opening 21 and travels along channel 18, passing through the eyes of hooks 6 which protrude into channel 18 through shorter vertical channels 23. Near the rearward portion of lure body member 1 channel 18 turns briefly downward and forward and then briefly upward and forward until it intersects with itself. So, after passing through the eyes of hooks 6, wire 19 continues along the channel 18 until the end of wire 19 can be secured by wrapping it around the portion of wire 19 found lying in the horizontal portion of channel 18.

The longitudinal section of FIG. 3 also shows that the extreme rearward portion of the lure body member 1 is recessed, or partially cut away, to provide one side for vertical slot 15. Hole 16 is provided, as in FIG. 2, to permit attachment of a tail portion 14 by passing a pin therethrough. Also, weight element 13 is provided as in FIG. 2.

In order to facilitate the formation of an accurately positioned channel 18 extending through the body of the lure, it is desirable to make the body in two parts which are joined together. The channel 18 is formed, as are vertical channels 23, by providing suitable complemental grooves in contiguous faces of the two body portions before they are joined.

Figure 4:
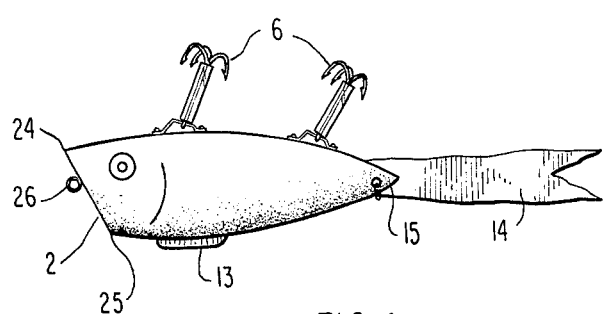
FIG. 4 is a side view of a lure in accordance with the invention with externally mounted hooks and adapted for fishing along the surface of the body of water.

Finally, FIG. 4 depicts the invention lure with externally mounted hooks designed for surface fishing. Unlike FIGS. 2 and 3, front face 2 of the lure body member is inclined downwardly and rearwardly from an upper leading edge 24 to a point 25 where the front end face joins the lower surface, or underside, of the lure body member 1. This change in inclination causes the lure to leap upward, rather than downward, in response to a tug on the line or fishing rod. As in the case of the bottom fishing lure, it is preferred that front face 2 be formed having a concavity as described in reference to FIG. 2. Otherwise, the external or internal mounting of hooks 6, weight element 13 attachment and adaptation of the extreme rearward portion of the lure body member 1 to provide a slot 15 for tail portion 14 attachment is as described in reference to FIGS. 2, 3 and/or 5.

The lure may be made in different colors, sizes and proportions according to the variety of fish which it is desired to catch. If made of wood, the lure may be provided with plastic eyes and suitably painted. Various colorations may be used as desired.

While the invention has been described and illustrated herein by references to various specific materials and procedures, it is understood that the invention is not restricted to the particular materials, combinations of materials and procedures selected for that purpose. Numerous variations of such details can be employed, as will be appreciated by those skilled in the art.

What is claimed is:

1. An artificial fishing lure comprising
an elongated body member of buoyant material having a generally fish shape with a forward end and a rearward end, the forward end having a front face inclined from a leading edge at an angle of 40° to 55° to the longitudinal axis of the lure, the front face having means for attachment to a line, and the rearward end having an extreme rearward end being adapted for the attachment of a flexible tail portion,
one or more hooks projecting upward from the dorsal surface of the body member and mounted external to the body member by inserting a shaft portion of each hook through a length of a hollow, flexible tube-shaped article approximately equal to the length of the shaft portion, passing a metal strap through an eye at the terminal end of the shaft portion and securing the ends of the metal strap to the body member to permit limited movement independent of movement of the body member but stabilizing the hooks to maintain the upward projection, and
a weighted element attached to the underside of the forward portion of the body member.

2. The lure of claim 1 wherein the front face is inclined upwardly and rearwardly from a leading edge where the front face joins the lower surface of the body member to a point where the front face joins the dorsal surface of the body member.

3. The lure of claim 2 wherein a churning spoon is attached to and substantially covers the front face and projects beyond the leading edge to extend the angle of inclination.

4. The lure of claim 3 wherein the means for attachment of a line to the body member is an eye screw which also serves to attach the churning spoon to the front face.

5. The lure of claim 1 wherein the hooks are two triple hooks.

6. The lure of claim 1 wherein the front face is inclined downwardly and rearwardly from an upper leading edge where the front face joins the dorsal surface of the body member to a point where the front face joins the underside of the body member.

7. The lure of claim 1 wherein the adaptation for the attachment of the tail portion at the extreme rearward end of the body member is provided as a vertical indentation along the longitudinal axis of the body member to form a slot, each vertical side member on either side of the indentation having a space provided for the passage therethrough of a pin for attachment of the tail portion within the slot.

8. The lure of claim 7 wherein the tail portion is formed from pork rind, leather or plastic material.

* * * * *